No. 803,139. PATENTED OCT. 31, 1905.
B. A. SINN & F. H. WAGNER.
GAS PURIFIER.
APPLICATION FILED FEB. 5, 1904.
2 SHEETS—SHEET 1.
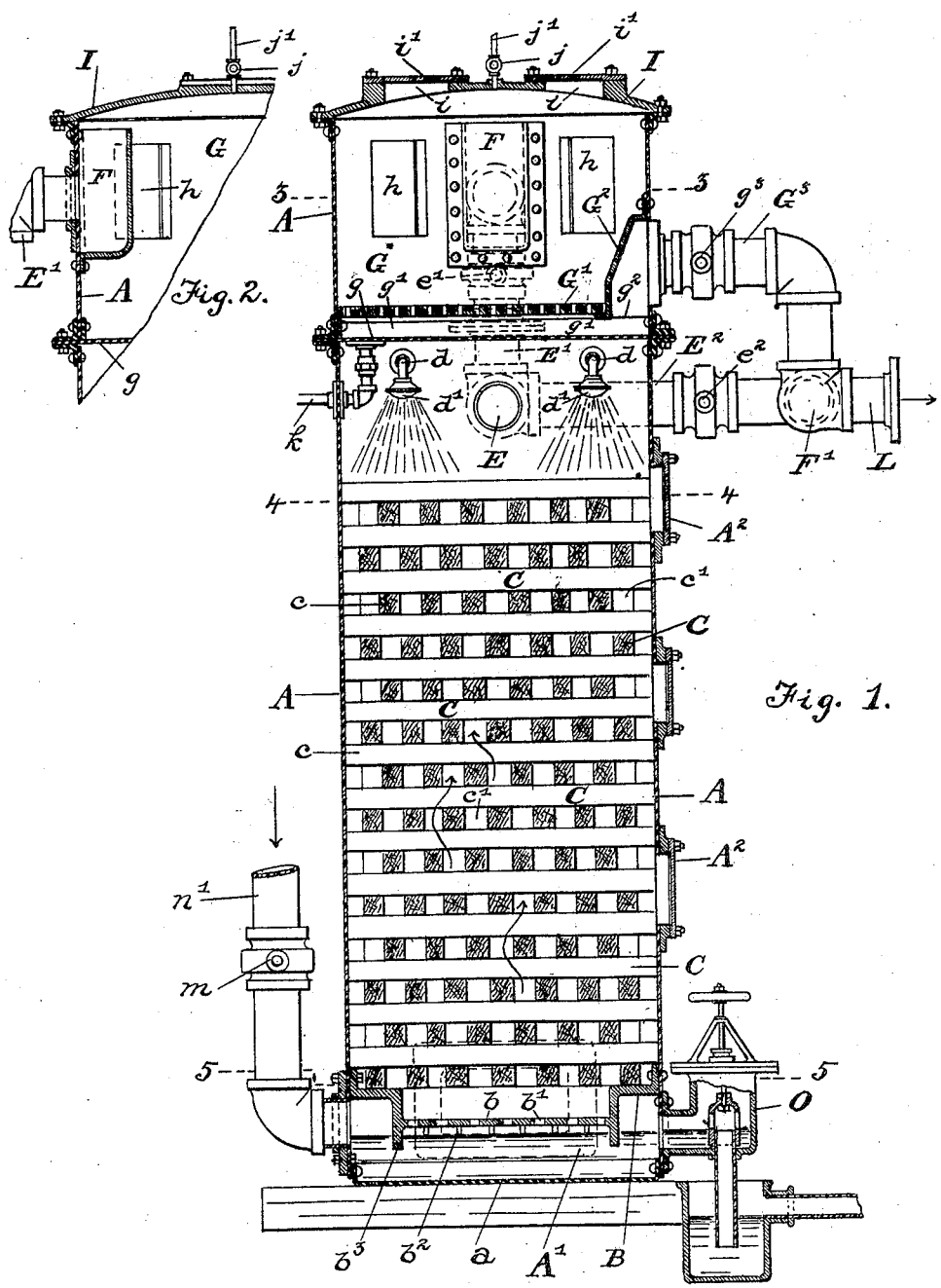
Witnesses:
S. John Williamson
G. Ferdinand Vogt.
Inventors.
Bernhard A. Sinn
Frederick H. Wagner
By Mann & Co.
Attys.

No. 803,139. PATENTED OCT. 31, 1905.
B. A. SINN & F. H. WAGNER.
GAS PURIFIER.
APPLICATION FILED FEB. 5, 1904.
2 SHEETS—SHEET 2.
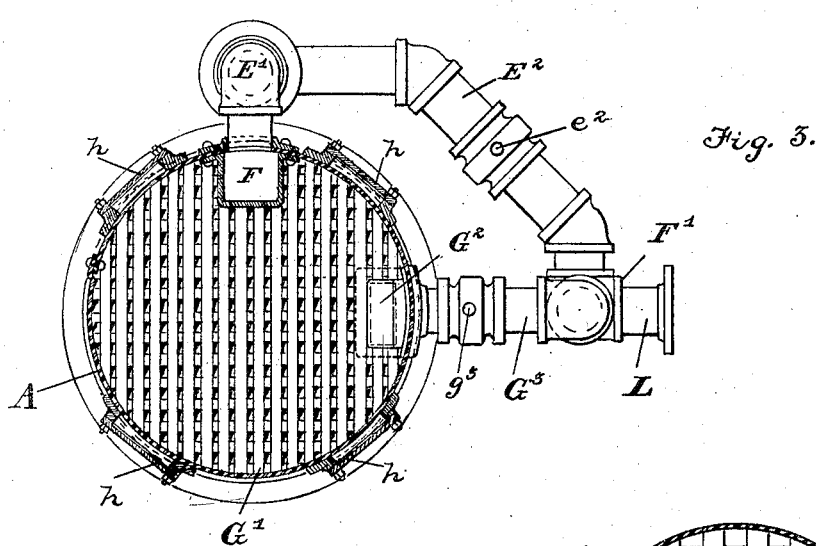
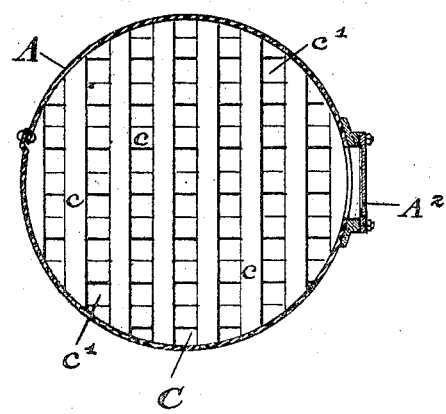
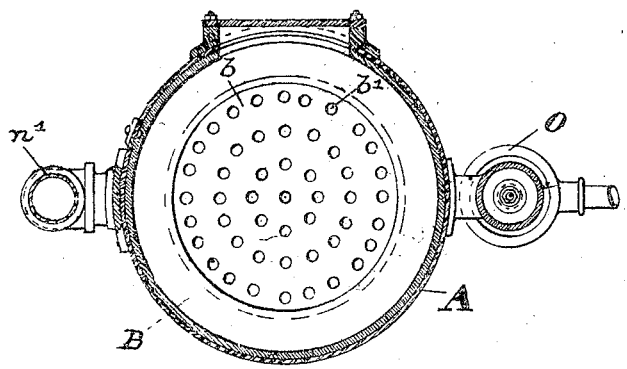
Witnesses:
S. John Williamson
Ferdinand Vogt
Inventors:
Bernhard A. Sinn
Frederick H. Wagner
By Mann & Co,
Attys.

UNITED STATES PATENT OFFICE.

BERNHARD A. SINN AND FREDERICK H. WAGNER, OF BALTIMORE, MARYLAND.

GAS-PURIFIER.

No. 803,139.     Specification of Letters Patent.     Patented Oct. 31, 1905.

Application filed February 5, 1904. Serial No. 192,074.

*To all whom it may concern:*

Be it known that we, BERNHARD A. SINN and FREDERICK H. WAGNER, citizens of the United States, residing at Baltimore, State of Maryland, have invented certain new and useful Improvements in Gas-Purifiers, of which the following is a specification.

This invention relates to a combined gas washer, scrubber, and purifier, and is particularly applicable for use in connection with a gas apparatus wherein a gas-engine produces a suction which draws the gas from the generator through the washer, scrubber, and purifier and any intervening apparatus.

The present invention relates to an improved construction of washer, scrubber, and purifier, all of which are contained in a single inclosing shell and operate successively in order that the incoming gas may be thoroughly broken up, washed, and cleaned as it passes through the washer and scrubber to remove the heavier particles carried in suspension prior to passing through the purifier, where the remaining impurities are deposited.

The invention is illustrated in the accompanying drawings, in which—

Figure 1 illustrates a vertical longitudinal section through the inclosing shell, in which the washer has position at the bottom, the purifier at the top, and the scrubber is interposed between the washer and purifier. Fig. 2 illustrates a fragmentary sectional view of that part of the purifier where the gases enter, being a central vertical section view of Fig. 1. Fig. 3 illustrates a horizontal sectional view through the purifier on the line 3 3 of Fig. 1. Fig. 4 is a sectional plan view of the scrubber on the line 4 4 of Fig. 1, and Fig. 5 is a similar view immediately above the washer and on the line 5 5 of Fig. 1.

In the drawings referring particularly to Fig. 1, A designates a vertical cylindrical shell of air-tight construction provided at its lower end with a bottom plate $a$. Within the lower end of this cylinder a ring-plate is riveted to the shell. This ring-plate is provided with an upper circular ring-flange B and a central depressed circular plate $b$, provided with a plurality of perforations $b'$ and on its lower surface with a plurality of downwardly-projecting knobs or tips $b^2$. The said ring-plate is also provided with an annular bottom flange $b^3$, which projects lower down than the circular plate $b$. The space below the ring-plate is the washing-chamber A'. Arranged above the washing-chamber A' and supported by the upper ring-flange B are a plurality of wooden grids C, which comprise a series of trays, each made up of a plurality of horizontal crossed bars $c$, spaced apart to form square openings $c'$, through which latter the gases from the washer may ascend. This is the scrubber. It will also be seen by reference to Fig. 1 that the cross-bars which extend in the same parallel direction are arranged so that the square openings formed by the bars of one tray will be confronted both above and below by cross-bars. By this arrangement of tray-bars with respect to each other it will be seen that a series of tortuous passages are formed, as indicated by darts, and the ascending gas must travel through these passages on its way to the top of the shell. A plurality of removable plates or doors $A^2$ are provided in the side of the shell, one above the other, by means of which access may be gained to the interior of the shell in order to place the tray-bars in position.

Above the grids or trays C and projecting on the interior of the shell are water-tubes $d$, provided with spraying-nozzles $d'$, from which water is showered down upon the trays and flows through the tortuous passages and scrubs and washes the broken-up gases as the latter ascend through said passages.

A pipe E opens into the shell at a point above the grids or trays C, and said pipe is connected with a vertical branch pipe E', having a valve $e'$, (shown in broken lines,) and above said valve the branch pipe E' opens through the shell and into a pocket or receptacle F, which is riveted on the interior of the shell in the purifying-chamber G. This pocket or receptacle is open only at the top, and the gases entering the pipe E are conveyed through the vertical branch pipe E' and discharged into the trough or receptacle F, from which latter they pass out the top opening and enter the purifying-chamber G. A horizontal branch pipe $E^2$ is also connected to the pipe E on the exterior of the shell and is provided with a valve $e^2$, and the end of this pipe enters a union connection F' for a purpose presently to be described. The purifying-chamber G is provided with a perforated bottom G', the bottom surface of which latter is spaced from the horizontal partition $g$, which separates the purifying-chamber from the scrubber. This space forms a passage-way $g'$. At one side and near the bottom the chamber G is provided with an upwardly-projecting hood $G^2$, which is provided with a bottom opening $g^2$ in communication with the passage-way $g'$. A discharge-pipe $G^3$, having a valve $g^3$, establishes communication between the said interior hood $G^2$ and the union connection F'. By this system of pipes and valves it will be seen that the gases may be conveyed from the scrubber directly to the union F' through the pipe E (the valve $e'$ being closed) and branch pipe $E^2$, thereby shunting the purifying-chamber G, or, on the other hand, the gases may be conveyed through pipe E, the valve $e'$ being open, and the pipe E' into the pocket F and from the latter through the purifier-chamber G, perforated bottom G', passage-way $g'$, hood $G^2$, and discharge-pipe $G^3$ to the said union F'. This arrangement of pipe connections is provided in order that the gas may be cut off from the purifier to permit the latter to be cleaned or repaired without entirely discontinuing the use of the apparatus.

The shell is provided in its side near the top with doors $h$, which permit access to the purifying-chamber G and which when shut render the chamber gas-tight.

A cap-plate I fits over the top of the shell and closes the chamber G. This cap-plate is provided with holes $i$, which are closed by plates $i'$. A test-cock $j$ is fitted into the cap-plate I and is in communication with the purifying-chamber G. By means of this cock gas may be permitted to escape through the tube $j'$ for the purpose of testing the same before it is conveyed to the engine. A drain-pipe $k$ opens through the horizontal partition $g$ and makes communication with the passage-way $g'$ and leads down and laterally through the shell A. This pipe is provided with a valve, (not shown,) which may be opened when the valves $e'$ and $g^3$ are closed in order to permit of draining the chamber G when the doors $h$ or holes $i$ are opened.

A gas-inlet pipe $n'$ leads from the gas-generator (not shown) and has a valve $m$ and is tapped into the washing-chamber A' and supplies the crude gas into the shell at its bottom.

A pipe L, attached to the union F', leads to the engine. (Not shown.)

A liquid-seal trap O of any suitable construction is provided at the bottom of the shell and in communication with the washing-chamber A'. By means of this trap the water from the scrubber passed into the washer A' is permitted to pass off without allowing the escape of the gases. The water seal will maintain the water in the washing-chamber at height sufficient to keep the bottom flange $b^3$ submerged.

In the operation of the device the incoming gases by way of pipe $n'$ are discharged into the washing-chamber A', where by the operation of the annular bottom flange $b^3$ they pass down in the water and then up to the circular plate $b$. Here the gas contacts with the knobs or teats $b^2$ and finds egress through the perforations $b'$. While ascending through said perforations, the gases are met by the descending water. The gases then pass up through the tortuous passages of the scrubber, where they are thoroughly broken up and washed and pass out through the pipe E and then enter into the purifying-chamber G, as heretofore described. This chamber G is preferably filled with wood shavings, where the remaining impurities are deposited. If the gases contain any tar, this treatment is most effective for removing the same. The gases pass down through the shavings and through the perforated bottom G' into the passage-way $g'$. From the passage-way $g'$ the gases pass up through the hood $G^2$ and are conveyed by pipe $G^3$ to the union connection F' and from the latter are discharged into a pipe L, leading toward the engine or to a dust-arrester, as desired.

Having thus fully described our invention, what we claim as new, and desire to secure by Letters Patent, is—

1. In an apparatus of the class described the combination with a shell, of a ring-plate within the shell and at the lower end thereof, said ring-plate having a central perforated depression and an annular bottom flange which projects below said depressed center; a water-chamber in the bottom of said shell beneath said ring-plate; a gas-inlet pipe entering the shell below said ring-plate and at the side of said bottom flange; a liquid-seal trap also at the bottom of said shell and below said ring-plate; a plurality of grids above said ring-plate; a partition in the shell above the grids to form a chamber; a receptacle in said chamber; a pipe having one end opening into the shell above the grids and the other end opening in said receptacle in the chamber above the grids, and a gas-discharge pipe connected to the shell above the said partition.

2. In an apparatus of the class described the combination with a shell; a water-chamber in the bottom of said shell; a perforated circular plate in said shell above the water-chamber; a plurality of grids or trays above said perforated plate; a partition in the shell above said grids; a separate chamber in the upper part of said shell above said grids; means for conducting the gases from said shell at a point above the said grids and discharging them into said upper chamber; a perforated bottom in said upper chamber and spaced from said partition, and a gas-outlet opening into the space between the perforated bottom of the upper chamber and said partition.

3. In an apparatus of the class described the combination with a shell; a water-chamber in the bottom of said shell; a ring-plate also in said shell and having an annular downturned flange and a perforated depressed center plate; a gas-inlet pipe opening into said water-chamber and confronted by said downturned flange; a water-trap at the side of said shell and in communication with said water-chamber; a series of crossed bars in said shell and supported by said ring-plate; a water-spray above said bars; a partition in the shell above said water-spray to form an upper chamber; a pipe having one end opening into the shell above the grids and the other end opening in the chamber above the partition; a perforated bottom in said upper chamber and above said partition; a hood attached to the shell and opening into the space between said perforated bottom and said partition and a gas-pipe opening into said hood.

In testimony whereof we affix our signatures in the presence of two witnesses.

BERNHARD A. SINN.
FREDERICK H. WAGNER.

Witnesses:
  WM. D. POULTNEY,
  G. FERDINAND VOGT.